United States Patent

Staker et al.

[15] 3,660,022
[45] May 2, 1972

[54] RECOVERY OF COPPER

[72] Inventors: Walter L. Staker; Karl C. Dean; Carl J. Chindgren, all of Salt Lake City, Utah

[73] Assignee: The United States of America as represented by the Secretary of the Interior

[22] Filed: Mar. 2, 1971

[21] Appl. No.: 120,360

[52] U.S. Cl. .................................. 23/135, 75/101 R, 75/103, 75/108, 75/117
[51] Int. Cl. ................................. C22b 15/10, C22b 15/14
[58] Field of Search ................... 75/117, 101 R, 103, 108; 23/135

[56] References Cited

UNITED STATES PATENTS

| | | | |
|---|---|---|---|
| 1,131,986 | 3/1915 | Benedict | 75/117 X |
| 2,352,096 | 6/1944 | Hay | 23/135 |
| 2,647,819 | 8/1953 | McGauley | 75/103 X |
| 2,647,829 | 8/1953 | McGauley et al | 75/103 |
| 2,670,271 | 2/1954 | Thomsen | 23/135 X |
| 2,693,404 | 11/1954 | Mackiw | 75/117 X |

*Primary Examiner*—L. Dewayne Rutledge
*Assistant Examiner*—G. T. Ozaki
*Attorney*—Ernest S. Cohen and William S. Brown

[57] ABSTRACT

Copper is recovered from copper-containing materials, such as scrap or ores, by leaching with cupric ammonium carbonate solution, followed by addition of elemental sulfur to precipitate copper sulfide and regenerate the cupric ammonium carbonate leach solution.

3 Claims, No Drawings

RECOVERY OF COPPER

This invention relates to an improved method for recovering copper from copper-containing materials such as scrap and ores. The invention may be used to process materials containing metallic copper, including ores, reduced ores, scrap metal, etc. It may also be used to win copper from ammoniacal solutions in which dissolved cupric copper is reduced to cuprous copper. The copper is recovered as a high-grade copper sulfide which may be converted to high-grade metallic copper with recovery of the sulfur by conventional methods. Thus, the invention would be of direct benefit to industry and to the general public by providing a process for recovering copper from scrap more simply with lower operating costs, smaller capital requirements, and economical reagent recovery.

A conventional procedure for recovering metallic copper from scrap employs cupric ammonium carbonate leach solution and uses oxygen or air to oxidize the copper dissolved in the leach solution. Oxygen is introduced into the solution in an enclosed pressure system or by pumping air through the solution in a packed tower. The dissolved copper is recovered from the leach solution by evaporation or by hydrogen reduction at elevated temperature and pressure. Both of these methods, however, require considerable capital investment and the operating costs are relatively high. Accordingly, a more efficient means for recovery of the dissolved copper from the leach solution is needed.

It has now been found, according to the process of the invention, that elemental sulfur may be employed to precipitate the dissolved copper in the form of either cupric sulfide or cuprous sulfide and that such a procedure gives a rapid and efficient recovery of copper. In addition, this process has the advantage that the leach solution is simultaneously regenerated for direct recycling in the leaching operation.

The objects of the present invention are accomplished by two operations. The first is the leaching-precipitation operation and the second is the separation of the copper sulfide product from the leach solution. These operations are accomplished by leaching metallic copper from scrap, etc., with cupric ammonium carbonate leach solution in a closed leaching vessel. The leaching may be accomplished at ambient temperatures and pressures, in a nonoxidizing atmosphere. Substantially the entire body of leaching liquor is usually circulated relative to the scrap mass to speed up the dissolution of metallic copper. Actual operation of the circulation may be conducted by the use of two or more tanks. A pump may be used to recirculate the solution from one tank to the other. Leaching is accomplished in one tank and the copper sulfide product is settled in the second tank. A slurry of powdered elemental sulfur in regenerated leach solution is rapidly mixed with the reduced leach solution prior to entering the settling tank. A filtering unit may be used to separate the copper sulfide product from the leach solution in lieu of the settling tank. The copper sulfide product is then removed and the clarified leach solution returned to the leach tank for further leaching.

An alternate method of accomplishing the objects of the invention is to conduct the leaching and precipitation operations in the same vessel by adding powdered elemental sulfur to the leach solution in the leaching vessel and circulating the solution. The copper sulfide product may be removed periodically, or after all of the metallic copper has been dissolved.

The copper sulfide product may be separated from the leach liquor by settling, filtering, or other conventional means. This is best performed in a nonoxidizing atmosphere. After separating the copper sulfide from the leach liquor, residual liquor may be removed from the product with water containing a small amount of ammonium hydroxide (this may be previous wash liquor), then with water. Steam may also be used to wash the copper sulfide if desired. The washed copper sulfide product may be further processed according to conventional methods, e.g., (1) smelting, (2) pressure leaching and hydrogen precipitation, and (3) ferric sulfate leaching and electrowinning.

It is important that the leaching and precipitation of the dissolved copper be accomplished in a nonoxidizing atmosphere. This is best performed by leaching and precipitating in a closed system in the absence of air to obtain the most economical usage of sulfur. The sulfur is added to the reduced leach solution at such a rate that about 1 gram-mole of sulfur is added for every 2 gram-moles of metallic copper dissolved. This will assure that a cuprous sulfide is precipitated rather than a cupric sulfide. However, any cupric sulfide formed may be converted to the cuprous form by reaction with leach liquor containing excess cuprous copper in solution.

The leaching step of the invention is conventional and is disclosed, e.g., in U. S. Pat. No. 3,374,091. The leaching capacity of the cupric-ammonium carbonate solution is directly proportional to the reagent concentration, so that the use of any particular concentration is primarily a matter of choice based on engineering and economic factors. The primary variable involved in the leaching operation is the cupric copper concentration of the leach solution, together with sufficient ammonia and carbonate to hold the dissolved copper in solution. The concentration of the cupric ammonium carbonate leach solution may vary over wide limits but will generally contain about 10 to 60 grams of cupric copper per liter with an ammonia-to-copper weight ratio of 1.3 to 4 grams of ammonia per liter for each gram of copper per liter and a carbon dioxide-to-ammonia weight ratio of about 0.35 to 0.9 grams of carbon dioxide per liter for each gram of ammonia per liter. The preferred reagent concentrations will depend on the particular leaching-precipitation system used. In a batch system, where leaching and simultaneous precipitation of the extracted copper with elemental sulfur are done in the same vessel, about 30 grams of copper per liter may be used with an ammonia-to-copper weight ratio of about 2.2 to 1 and a carbon dioxide-to-ammonia weight ratio of about 0.5 to 1. When leaching in one vessel and precipitating with elemental sulfur in a separate vessel, an ammonia-to-copper weight ratio of about 2.2 to 1 and a carbon dioxide-to-ammonia weight ratio of about 0.5 to 1 are again preferred, together with about 60 grams of cupric copper per liter. The amount of leach solution used in the simultaneous extraction-precipitation need only be sufficient to cover the material to be extracted and permit vigorous agitation to bring the elemental sulfur and the pregnant leach solution into intimate contact. The amount of leach solution used when extracting metallic copper in one vessel and precipitating in a separate vessel should be sufficient to provide about 1.5 to 2.5 moles of cupric copper per mole of metallic copper to be extracted. Temperature of the leach solution will vary from about 15° to 25° C, while the pH will generally be about 10 to 11.

Addition of elemental sulfur, according to the process of the invention, is best accomplished by addition of the sulfur in finely divided form, i.e., about 60 to 100 mesh. An amount of sulfur is added to provide about 1 gram-mole of sulfur for every 1 to 2 gram-moles of dissolved copper. The sulfur may be added directly to the leach solution or it may be added as a slurry in regenerated leach solution, as discussed above. Temperature and pressure of the leach solution during sulfur addition, and subsequent precipitation of copper sulfide, are preferably ambient but may range from about 15° to 55° C and 0 to 20 psi gauge.

Apparatus used in the process of the invention is not critical and may vary widely, provided that the closed system is used, as well as a means for efficiently mixing the elemental sulfur in the leach solution and for removing the precipitated copper sulfide. Suitable means are discussed above and in the examples that follow. However, numerous other conventional means will be apparent to those of ordinary skill in the art.

The following chemical equations represent the most probable reactions taking place in the leach solution after addition of the elemental sulfur:

$$Cu^0 + Cu^{++} \rightarrow 2Cu^+ \qquad (1)$$
$$2Cu^+ + S \rightarrow CuS + Cu^{++} \qquad (2)$$
$$4Cu^+ + S \rightarrow Cu_2S + 2Cu^{++} \qquad (3)$$
$$2Cu^+ + CuS \rightarrow Cu_2S + Cu^{++} \qquad (4)$$

$$2Cu^0 + 2Cu^{++} + S \rightarrow Cu_2S + 2Cu^{++}(1+3) \quad (5)$$

The process of the invention will be more specifically illustrated by the following examples:

EXAMPLE 1

1,350 grams of incinerated automobile generator wire (90+ percent Cu) was leached in a 3-liter stoppered flask with cupric ammonium carbonate leach solution. The starting leach solution contained, in grams per liter, 43.5 Cu, 57 $NH_3$, and 43 $CO_2$. The leach solution was pumped up through the mass of copper wire in the leaching flask and out at the top of the flask. The solution flowed from the leach flask to a small precipitation flask where a slurry of powdered elemental sulfur was continuously being added and vigorously mixed with the leach solution. The metallic copper dissolved in the leach flask (equation (1), above) and precipitated and regenerated the leach solution in the precipitation flask (equation (2)). The slurry of precipitated copper sulfide and leach solution flowed from the precipitation flask to a large settling flask where the copper sulfide rapidly settled from the regenerated leach solution. The regenerated supernatant leach solution from the settling flask was returned to the leach flask for further leaching. This process was continued until all of the metallic copper was dissolved and converted to copper sulfide. Approximately 685 grams of elemental sulfur was used for precipitating the copper dissolved in the leach flask. The regenerated leach solution contained 43 grams of copper per liter. The copper sulfide product was filtered from the leach liquor, washed with distilled water containing a small amount of ammonia, then washed with distilled water and dried. The product copper sulfide (1,937 grams) contained, in percent, 65.2 Cu, 33.3 S, 0.03 $NH_3$, 0.1 $CO_2$, and less than 0.02 elemental sulfur. This product copper sulfide contained 1 gram-mole of sulfur for each gram-mole of copper.

EXAMPLE 2

Eighty grams of 30-gauge incinerated copper wire was leached with 400 ml of cupric ammonium carbonate leach solution and 36 grams of powdered elemental sulfur in a stoppered flask. The metallic copper again dissolved and precipitated and regenerated the leach solution, the leaching and precipitation being carried out in the same flask at ambient temperature and pressure. The starting leach solution contained, in grams per liter, 27.3 Cu, 94 $NH_3$, and 88 $CO_2$. The metallic copper was converted to copper sulfide in 1 hour.

The product copper sulfide was filtered from the regenerated leach liquor, washed with dilute ammonia water, distilled water, and dried. This product of 115 grams contained, in percent, 68.0 Cu and 31.0 S and was principally a cupric sulfide containing 1 gram-mole of sulfur for each gram-mole of copper. The regenerated leach solution contained 27.2 grams of copper per liter.

EXAMPLE 3

Eighty grams of 30-gauge incinerated copper wire was leached in 500 ml of cupric ammonium carbonate leach solution and 21 grams of powdered elemental sulfur. The starting leach solution contained, in grams per liter, 30.5 Cu, 94 $NH_3$, and 88 $CO_2$. The metallic copper dissolved and precipitated, and regenerated the leach solution (equation (3)). The leaching and precipitation was done in the same flask. The metallic copper was converted to copper sulfide in 1 hour at ambient temperature and pressure. The product of 100.2 grams was washed and dried and found to contain, in percent, 78.0 Cu and 20.6 S. This product was a cuprous sulfide containing 1 gram-mole of sulfur for each 2 gram-moles of copper. The regenerated leach solution contained 32.9 grams of copper per liter.

EXAMPLE 4

500 ml of cupric ammonium carbonate leach solution and 50 grams of cupric sulfide, formed as in example 1, were used to leach 40 grams of 30-gauge incinerated copper wire in a stoppered flask. The leach solution contained, in grams per liter, 31 Cu, 94 $NH_3$, and 88 $CO_2$. The copper sulfide added contained, in percent, 65 Cu and 33 S. The metallic copper was dissolved in 1 hour at ambient temperature and pressure. The metallic copper dissolved in the leach liquor and precipitated as cuprous sulfide, with regeneration of the leach liquor (equation(4)). The copper sulfide product was filtered from the leach solution, washed and dried giving 80 grams of product. The product was found to contain, in percent, 79 Cu and 20 S. This product was a cuprous sulfide containing 1 gram-mole of sulfur for each 2 gram-moles of copper. The cupric sulfide was stoichiometrically converted to cuprous sulfide. In this example, all of the metallic copper dissolved was not reprecipitated. In order to precipitate all of the metallic copper dissolved, using cupric sulfide as precipitant, the amount of cupric sulfide should be slightly more than 1.5 times as much as the amount of metallic copper dissolved.

What is claimed is:

1. A method for recovery of copper from scrap or ores comprising (1) leaching the scrap or ore with an aqueous cupric ammonium carbonate solution to dissolve the copper and (2) treating the resulting copper-containing leach solution with elemental sulfur to precipitate the copper as sulfide and to simultaneously regenerate the cupric ammonium carbonate leach solution.

2. The method of claim 1 in which both steps (1) and (2) are conducted in an essentially nonoxidizing atmosphere.

3. The method of claim 1 in which both steps (1) and (2) are conducted at ambient temperature and pressure.

* * * * *